United States Patent

[11] 3,596,467

| [72] | Inventor | Paul A. Avery<br>Shelton, Conn. |
|---|---|---|
| [21] | Appl. No. | 872,938 |
| [22] | Filed | Oct. 31, 1969 |
| [45] | Patented | Aug. 3, 1971 |
| [73] | Assignee | Avco Corporation<br>Stratford, Conn. |

[54] INTEGRATED FUEL CONTROL SYSTEM FOR A GAS TURBINE ENGINE
14 Claims, 4 Drawing Figs.

[52] U.S. Cl. ................................................. 60/39.28, 74/200
[51] Int. Cl. ................................................. F02c 9/06
[50] Field of Search ...................................... 60/39.28, 39.16, 242, 243, 39.74 S; 74/200

[56] References Cited
UNITED STATES PATENTS

| 3,313,106 | 4/1967 | Matthews | 60/39.28 |
| 2,896,700 | 7/1959 | McCourty | 60/243 |

*Primary Examiner*—Clarence R. Gordon
*Attorneys*—Charles M. Hogan and Gary M. Gron ABSTRACT: The disclosure illustrates an integrated fuel control system for a gas turbine engine. The system comprises a stepless variable speed ratio toroidal-type transmission driven by a rotor assembly of the engine. The output from the variable-speed transmission is connected to an alternator and a centrifugal fuel pump. The pump receives fuel from a suitable source and pressurizes it for delivery into the engine. An electrical computer generates a scheduled fuel flow signal and a flow transducer generates an actual fuel flow signal. These signals are fed to a comparator which supplies the resultant output to a torque motor. The torque motor causes a change in the speed ratio of variable speed drive to change the centrifugal pump r.p.m. and the resultant fuel flow to the engine. The electrical output of the alternator is used by the computer, comparator and actual flow-generating elements and other engine control devices. In an alternate design the variable-speed drive and centrifugal pump are used to maintain a constant pressure differential across a fuel flow metering valve which is driven by a hydromechanical fuel control.

INVENTOR.
PAUL A. AVERY

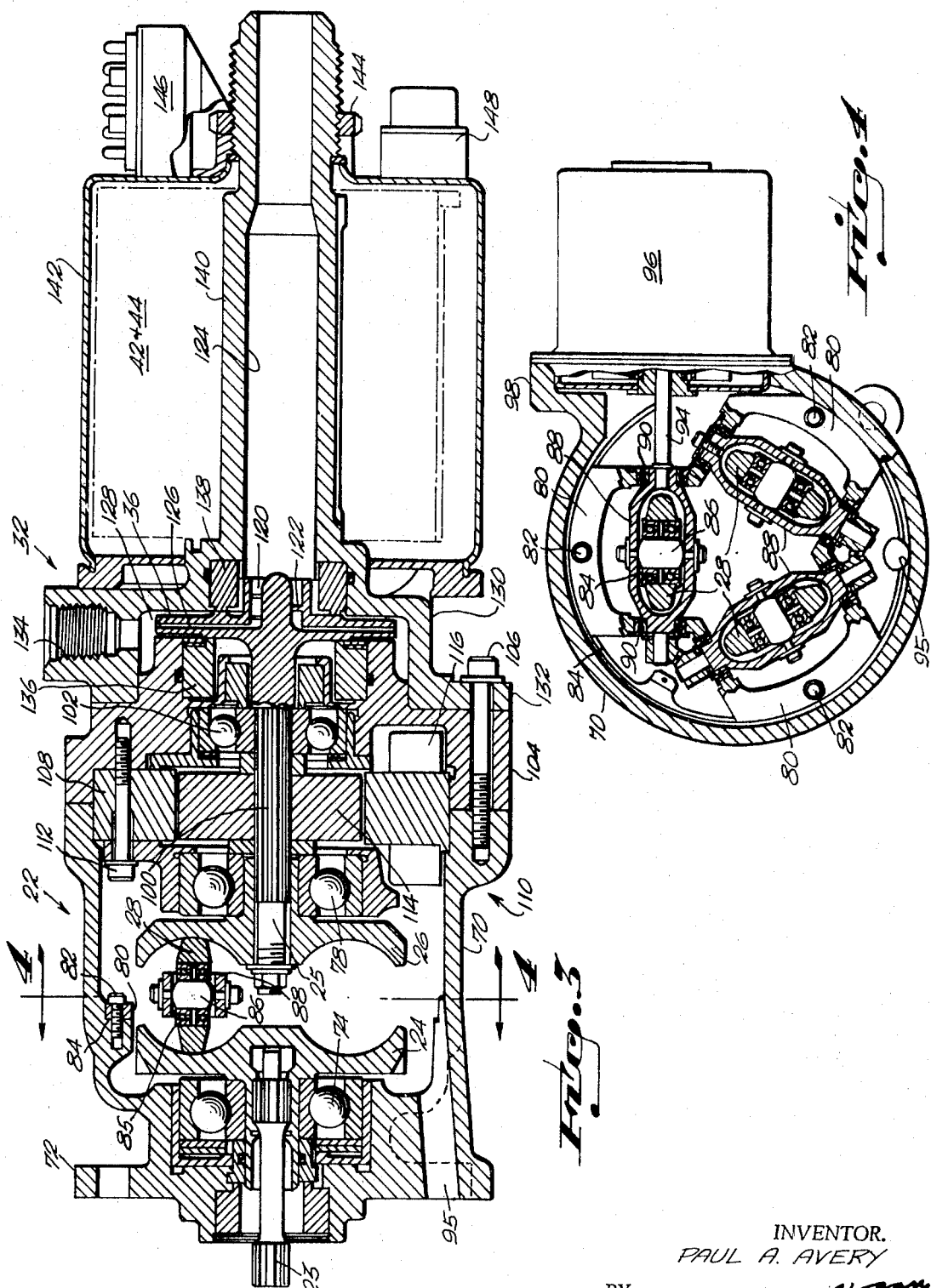

INTEGRATED FUEL CONTROL SYSTEM FOR A GAS TURBINE ENGINE

In recent years there have been significant advances in the fuel control art to enable control of gas turbine engines for optimum, reliable and safe performance. These advances have required exceedingly complex and numerous control functions from the devices used to supply fuel to the gas turbine engine. Examples of these control requirements are ability to terminate improper starts of the engine, control fuel to avoid compressor surge in the engine, provide control signals for variable-vane mechanism or compressor bleed assemblies. While these demands on the complex control requirements have been increasing, the environment under which the gas turbine engine function has become extremely severe. This especially so far as gas turbine engines used to power helicopters since the engine is exposed to a wide range of humidity, dust, sand and other materials which tend to make fuel contamination a serious problem.

The reason for this problem is that conventional fuel control systems use positive-displacement pumps whose output is bypassed in response to a pressure differential across a variable-area orifice actuated by a hydromechanical fuel control. To provide the complex control functions in such a control it is necessary to have a large number of accurately interfitting pistons, diaphragms, poppet valves, etc., all of which are driven or displaced directly by variations in the pressure of the fuel that will be consumed by the engine. When the airframe is exposed to the adverse environment described above, a large amount of contaminant matter finds its way to the fuel supply for the engine. This contaminant matter passes through the fuel control system and tends to collect on the rubbing surface of the conventional fuel control system.

Attempts have been made to minimize the effect of contaminants by providing extremely complex and expensive wash-type filters upstream of the fuel control and by providing weeping-type arrangements for the moving parts of the valve assembly. These arrangements, however, have limitations because the filters may eventually fail to function if not intermittently replaced and the contaminants get into the control to interfere with its normal operation.

Another problem posed by present fuel control systems is that since the engine driven pump has an output proportional to its input speed, as supplied by the engine, it must be designed for the condition wherein the engine requires a maximum supply of fuel for a minimum input rotation to the pump. Since this condition is experienced only briefly in the course of normal engine operation, the excess fuel output of the pump must be bypassed for all other engine conditions.

This bypassing of fuel flow has two undesirable effects. The first of which is that an excess of power must be required to drive the oversized pump. The second of which is that the process of pressurizing the fuel by the pump and bypassing the fuel to the lower pressure upstream of the pump produces a thermodynamic process which increases the temperature of the fuel. Since the fuel is normally used as a heat exchanger for many items in the engine and an airframe, this increase of its temperature impairs its ability to function as a heat exchange fluid.

An additional problem with the conventional fuel controls is that the large pump is connected to the drive system of the engine and the hydromechanical fuel bypassing and metering assembly is at another position on the engine thereby increasing its contribution to the total weight of the engine and to the size of the engine.

Therefore it is an object of the present invention to provide a contamination-resistant, highly compact, lightweight and efficient fuel control system for a gas turbine engine.

The above objects are achieved in the broader aspects of the present invention by providing a fuel control system for a gas turbine engine having a rotor assembly rotatable over a widely varying rate of rotation. The fuel control system comprises a means for providing a fuel flow path from a supply to the engine. A fuel pump having a rotatable drive shaft is interposed in the flow path means for pressurizing fuel to a level dependent on the rate of rotation of the drive shaft of the pump. An infinitely variable speed ratio transmission connects the pump drive shaft with the rotor assembly of the engine. A means is provided for controlling the speed ratio of the variable drive to satisfy the fuel requirements of the engine irrespective of the rate of rotation of the engine rotor assembly.

The above and other related objects and features of the present invention will be apparent from a reading of the description of the disclosure shown in the accompanying drawings and the novelty thereof pointed out in the appended claims.

In the drawings:

FIG. 3 is a longitudinal section view of an integrated fuel control assembly embodying the control principles of the system shown in FIG. 1; and FIG. 4 is a section view taken on line 4—4 of FIG. 3.

Figures 1, 2:
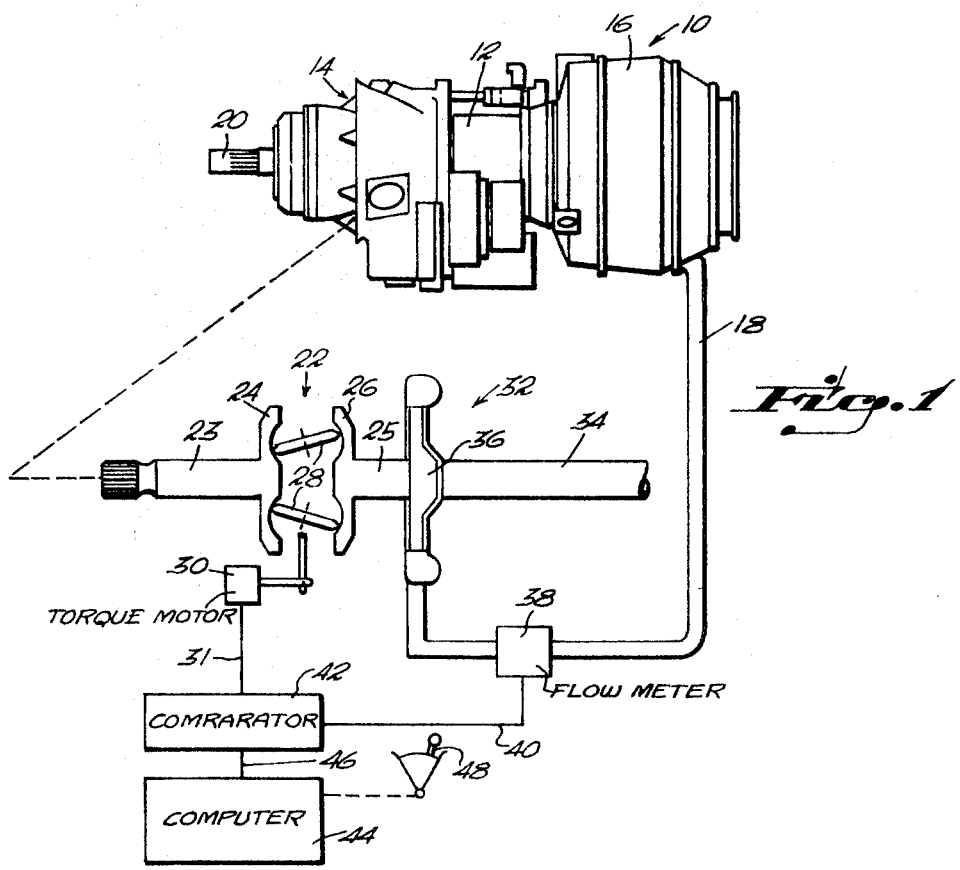
FIG. 1 is a diagrammatic view of a fuel control system embodying the present invention, along with a gas turbine engine with which it is used.
FIG. 2 is a diagrammatic showing of an alternative embodiment of the fuel control system shown in FIG. 1.

Referring to FIG. 1, there is shown a gas turbine engine 10 with which the present invention is used. The engine 10 comprises a compressor 12 which receives air from an inlet 14 for pressurization and delivery to a combustor unit 16. Fuel is supplied to a series of nozzles (not shown) by a nozzle supply conduit 18 for injection into the combustor unit 16. The fuel and compressed air are mixed and ignited to provide a propulsive gas stream which is passed across a turbine (not shown) to extract a portion of the available energy to drive the compressor unit. The gas stream is either discharged across a power turbine which drives a rotatable output shaft 20, as shown herein, or directly to the atmosphere to provide a reaction propulsion.

The supply of fuel to the engine 10 via the nozzle supply conduit 18 is controlled by a fuel control system comprising an infinitely variable speed ratio transmission, generally referred to by reference numeral 22. The variable speed ratio transmission 22, as illustrated, is a toroidal-type transmission of the general type disclosed in U.S. Pat. Nos. 2,959,972, 2,959,973 and 2,962,909, all having the same assignee as the present invention. The details of the variable-speed drive will be discussed in somewhat greater detail in connection with a specific embodiment of the present invention later in this discussion. However, for purposes of describing the broad concepts of the present invention, the following is a schematic description of the transmission.

An input drive shaft 23 and an input toroidal disk 24 are driven by a rotor assembly of the engine 10 (note the mechanical connection). Usually the rotor assembly which drives the transmission would be the gas generator compressor rotor. However, for some installations power may be derived from the output shaft 20. A rotatable output shaft 25 and an output toroidal disk 26 are positioned from the input toroidal disk 24. A plurality of steerable drive wheels 28 are journaled in a fixed cage (not shown) so that one side of the wheel is driven by the input toroidal disk 24 and the opposite side of the wheel drives the output toroidal disk 26. The angle the disks make with the toroidal disks 24 and 26 is controlled by an actuator such as a torque motor 30. This establishes the relative points of contact with the disks and hence the resultant speed ratio of the transmission. Thus the driving wheels 28 may be steered from the position shown in FIG. 1 wherein the output shaft rotates to a lower rate than the input shaft to another position wherein the output shaft rotates at a higher rate than the input shaft.

The output shaft 25 of the transmission 22 is connected to a fuel pump 32 which receives fuel from a supply conduit 34 and pressurizes it for delivery to supply conduit 18 at a level dependent upon the rate of rotation of input shaft 26. The pump 32 is of the centrifugal type which receives fuel from the inlet conduit 34 and accelerates it through a rotor element 36 to a higher pressure level.

A flow transducer 38, interposed in conduit 18, generates an output control signal in line 40 which reflects the actual fuel flow through supply conduit 18. A suitable flow transducer for this purpose is a fluidic oscillator transducer based on the "Vonnegut whistle," as described by R. C. Chanaud, A. E. Rodley and D. F. White in their A.S.M.E. paper, "A Digital Flowmeter without Moving Parts." The flow transducer produces an oscillation directly proportional to the volume fuel flow through nozzle supply conduit 18 and this oscillation is detected electrically for transmittal via line 40 to a comparator 42.

A second input to the comparator 42 is provided from a computer 44 via line 46. The computer may take many forms but as herein illustrated it is briefly an electronic scheduling device which produces an electrical output signal reflecting a scheduled volume fuel flow for particular engine-operating conditions. This scheduled fuel flow is dependent in part upon inputs from an operator controlled power lever 48, as modified by other control parameters (not shown) which limit the flow scheduled by power lever 48 to prevent compressor surge or other adverse operating conditions. Computers of this type are well known in the art so it is not necessary to undertake a detailed explanation of its components. It is apparent that one skilled in the art can design and employ a computer for incorporation with the control system of FIG. 1.

The comparator 42 generates an electrical error signal which is directly proportional to the difference between the scheduled fuel flow and the actual fuel flow. This error signal is fed to the torque motor 30 via line 31 to vary the speed ratio of the toroidal transmission 22 and maintain the pressure output of the pump 32 at a level which causes the actual fuel flow to equal the scheduled fuel flow.

At this point it is important to note that fuel flow is only one of a number of engine-operating parameters that may be used to schedule the fuel to the engine 10. Examples of other parameters that can be employed to schedule fuel flow are turbine inlet temperature or compressor discharge pressure. If these parameters are used the computer generates the scheduled value of the parameter and a suitable turbine inlet temperature sensor or compressor discharge pressure sensor generates the actual value of the parameter.

In operation, the rotor of the compressor 12 is driven by a suitable starter motor up to a low-level engine speed. During this condition a startup fuel flow is demanded by the computer 44. Since the rate of rotation of the compressor is at a relatively low level, the resultant error signal from the torque motor 30 causes the toroidal transmission 22 to achieve a maximum step-up speed ratio. As combustion is established in the engine, the speed of the compressor rotor would increase to an idle level thereby increasing the input speed to the toroidal drive 22. The resultant increase in flow from the pump 32 is sensed by the flow meter. An error signal generated from the comparator 42 actuates the torque motor 30 to reduce the speed step-up ratio of the drive 22. As the engine is accelerated to normal operating levels and used to power, for example, an aircraft through taxi and takeoff, cruise, descent and landing, the drive ratio of the toroidal drive is varied through infinite ratios to always provide an output pressure from pump 32 which achieves the scheduled fuel flow demanded by the computer 44.

In FIG. 2 there is shown an alternative embodiment of the fuel control system of FIG. 1. In this system a toroidal transmission 22' receives an input from a gas turbine engine compressor rotor similar to the device of FIG. 1 and drives a centrifugal pump 32' which discharges to a nozzle supply conduit 18'. In this embodiment a metering valve 50 is interposed in the conduit 18'. The metering valve 50 has a variable-area orifice whose area is mechanically selected by inputs from a computer 52. The computer 52 may be one of a number of well-known hydromechanical or electrical computers which provide a displacement output signal for the variable area orifice in response to inputs from an operator-controlled power lever 54 as modified by other control inputs.

The pressure differential across the metering valve 50 is sensed by conduits 56 and 58 which are connected to opposite ends of a cylinder 60. A piston 62 is displaceable in the cylinder and has an output-actuating rod 64 which is connected by a suitable linkage 66 to the toroidal drive so that displacement of the piston rod 64 to the right, as shown in the drawing, causes an increase in the step-up speed ratio of the toroidal transmission 22'. The end of cylinder 60 which is exposed to pressure downstream of the metering valve 50 via conduit 58 has a spring 68 which urges piston 62 towards a position which increases the speed step-up ratio of the transmission 22'.

In operation of this device the pressure differential across the metering valve 50 is applied to opposite ends of cylinder 60 and causes the piston 62 to be displaced and vary the speed ratio of the transmission 22'. This in turn varies the pressure output of the pump 32' to maintain a pressure upstream of the metering valve which is a predetermined constant level above the pressure downstream of metering valve 50. As a result, the constant pressure of differential across the metering valve takes the flow through the valve directly proportional to its area, thereby simplifying the input requirements of the computer 52.

Reference is now directed to FIGS. 3 and 4 which illustrate a particular embodiment of the control system shown in FIG. 1. The elements of the control system in FIG. 1 are identified in FIGS. 3 and 4 with identical general reference characters to enable a better understanding of how the broad control concepts of FIG. 1 are applied to a particular design. In these FIGS. the toroidal drive 22 is positioned in a generally cylindrical housing 70 having a mounting flange 72 so that the housing 70 can be mounted on an accessory gearbox for the engine 10. The input toroidal disk 24 is journaled in a bearing assembly 74 and has an internal spline which receives the splined input drive shaft 23 adapted to engage an element in the engine accessory gearbox (not shown). The output toroidal disk 26 is journaled in a bearing assembly 78.

The drive wheels 28 are supported on a frame 80 which is mounted between the input and output toroidal disks 24 and 26 by screws 82 holding the frame 80 against shoulders 84 formed in the interior of cylindrical housing 70. The drive wheels 28 are each journaled through bearings 84 on central spindles 86 received in yokes 88. The ends of the yokes 88 are journaled in bearings 90 provided in frame 80. The ends of the yokes 88 pivot in unison in response to pivoting of an input shaft 94. A suitable lubrication system (not shown) provides a source of lubricating fluid to the various bearing assemblies in the transmission 22. A drain port 95 enables a return path for lubricating fluid from housing 70 to a sump chamber (not shown).

The input shaft 94 extends into a torque motor 96 suitably mounted on a flange 98 provided in the housing 70. The torque motor 96 may be a standard-type torque motor which provides a rotatable torque output in response to an electrical current input signal. This torque output through shaft 94 is used to steer the drive wheels 28 to new positions in order to vary the speed ratio of the toroidal drive 22, as previously described.

The output toroidal drive 26 receives the splined output shaft 25, bolted thereto, journaled at an intermediate position in a bearing assembly 102 which is mounted in a generally cylindrical housing 104, secured to housing 70 by screws 106. The bearing assembly 78 adjacent the output toroidal disk 26 is carried in a bearing support 106 bolted to a stator assembly 108 of an alternator generally indicated by reference character 110, by screws 112, only one of which is shown. A rotor assembly 114 is secured to and rotatable with the output shaft 100 and coil assemblies 116 at various positions around the stator assembly 108 provide an electrical output in response to rotation of the rotor assembly 114.

The centrifugal type fuel pump 32 is of the shrouded impeller type having its impeller 36 integral with the output shaft 25. The impeller 36 has an axially directed inlet 120 incorporating inducer vanes 122 which provide a more efficient entry of flow from an inlet passageway 124. A radially directed annular passageway 126 receives the flow from the inducer passageway 120 and radially diffuses and accelerates it to increase its pressure and discharge it into an annular chamber 128. The chamber 128 is formed around its outer periphery by a housing 130 having a flange 132 through which screws 106 extend. A threaded outlet port 134 provides a connection to the nozzle supply conduit 18. Annular carbon seal elements 136 and 138 respectively provide seals for the back and front side of the impeller 36.

The inlet passageway 124 is formed in a tubular necked-down elongated portion 140 extending from housing 130. The outer end of the tube 140 is threaded to receive a suitable connector for the supply conduit 34. The inlet tube 140 also provides a mounting for an outer casing 142 which enclosed the computer and comparator units 44 and 42, shown in phantom view for simplification purposes. The outer casing 142 is held on the tubular inlet 140 by means of a locknut 144. A multiple-input electrical receptacle 146 provides a connection between the computer 44 housed in casing 142 and the various interface devices on the engine and air frame. An additional receptacle 148 provides a connection between the comparator 42 and the remotely positioned flow meter 38. Although no connection is shown, the output from the transmission driven alternator 112 is used to supply electrical power to the computer 52 and comparators 44 and 42 and the flow meter 38.

The operation of the fuel control system shown in FIGS. 3 and 4 is essentially similar to the operation of the system of FIG. 1. In addition, the alternator accessory 110 is driven by transmission 22. Thus, during engine startup the alternator is driven at a maximum step-up speed ratio, as is the centrifugal pump 32. Thereafter, the speed ratio is decreased in accordance with the demands of the fuel control system, but the alternator r.p.m. remains at a relatively high speed for producing sufficient electrical power.

The embodiment described above provides an integrated fuel control system that is easily mounted on the engine and is easily removable from the engine for servicing and disassembly as described below. The computer casing 142 is removed from the inlet tube 140 by merely removing the locknut 144 and sliding the casing 142 away from housing 130. When this is done screws 106 are removed so that the housing 130 can be pulled away to expose the impeller 36 and its associated seals 138. The removal of screws 106 also enables the removal of housing 104 from housing 70, thereby removing the output toroidal disk, the alternator assembly 110 and the pump impeller as a unit. This facilitates inspection of the drive wheels 28 and the surfaces of the toroidal disks 24 and 26. Further disassembly of the output toroidal disks is enabled by unbolting the disk 26 from output shaft 100 and unscrewing the bearing support 102 from housing 104. This enables the bearing assembly 78 to be inspected and enables inspection of the alternator assembly of the bearing assembly 102. Reassembly of the integrated fuel delivery package is accomplished generally in a reverse fashion.

In all of the fuel delivery systems embodying the present invention which were described above, it is noted that the bypassing of fuel around a fuel-pressurizing pump is entirely eliminated. Thus, increase in fuel temperatures due to the bypassing process is eliminated to improve the ability of the fuel to function as a heat exchange medium. This feature is made possible by the infinitely variable toroidal drive 22 which maintains the r.p.m. of the pump impeller 36 at a level which maintains the fuel flow required by the engine, irrespective of the widely varying rotation of the rotor assembly. An example of such an extreme input variation is as follows: A suitable variable speed ratio toroidal drive is employed which has a step-up or stepdown ratio of 3.1:1. At an engine starting speed of 7,500 r.p.m. the speed ratio of the transmission 22 would be at a maximum step-up ratio to provide a pump speed of 23,700 r.p.m. At 100 percent engine speed of 75,000 r.p.m. the minimum pump speed could be 23,700 r.p.m. by maintaining a maximum stepdown ratio to provide a pump output pressure that is low enough to satisfy the requirements of a deceleration fuel flow limit. To achieve maximum required output flow at 100 percent engine speed it is only necessary to reduce the stepdown ratio of the toroidal drive transmission to obtain a pump r.p.m. of 47,400. Thus it is apparent that the toroidal drive provides a maximum pump output relative to an input speed for the worst possible condition, which is starting. Furthermore, it has the flexibility to reduce the speed ratio sufficiently to provide the minimum power requirements for normal engine operation. Since the pump speed at startup is at a relatively high ratio, where its output demands are greatest relative to its input speed, size may be correspondingly reduced to save weight and size. The same holds true for the alternator 110. Its available power is related to its input speed and its size. The input to the alternator at idle is sufficiently great to enable a relatively small size and lightweight.

It is apparent from the example shown that the r.p.m. variation of the pump and the alternator is relatively small compared to the speed variation of the input to the fuel control system. This feature is particularly advantageous when it is necessary to drive gas turbine engine accessories having a narrow r.p.m. input range. Examples of this type of accessory are the alternator, described above, and a hydraulic actuating system actuating pump. It should be apparent that other accessories requiring limited input speed ratios can be incorporated in the integrated fuel control system described above.

The use of the infinitely variable speed toroidal transmission to vary the speed of the centrifugal pump provides significant advantages from the standpoint of fuel contamination. First, there are no complex bypass valves which can seize due to foreign matter. Second, the centrifugal pump is capable of accepting and discharging highly contaminated fuel without seizing, such as would be encountered with gear or wobble plate pumps. Third, the elements exposed to the main fuel flow path are at a minimum, which further reduces the susceptibility of the package to contaminated fuel.

Having thus described the present invention, what I claim as novel and desire to be secured by Letters Patent of the United States is:

1. A fuel control system for a gas turbine engine having a rotor assembly rotatable over widely varying rates of rotation, said fuel control system comprising:
    means for providing a flow path for fuel from a supply to said engine for utilization thereby;
    a fuel pump having a rotatable drive shaft interposed in said flow path means for pressurizing fuel to a level depending upon the rate of rotation of the drive shaft of said pump;
    a stepless variable speed ratio transmission connecting the rotatable input to said pump with the rotor assembly of said engine;
    means for controlling the speed ratio of said variable transmission to satisfy fuel supply requirements of said engine irrespective of the rate of rotation of said rotor assembly.

2. A fuel control system as in claim 1 wherein said speed ratio means comprises:
    means for generating a control signal reflecting a scheduled engine operating parameter;
    means for generating a control signal responsive to the actual engine-operating parameter;
    means for receiving the scheduled and actual signals and generating an output signal proportional to the difference between the signals; and
    means for actuating said variable speed ratio transmission to change its speed ratio in response to the error signal.

3. A fuel control system as in claim 2 wherein said engine-operating parameter is fuel flow to said engine and wherein:
    said means for generating a control signal reflecting a scheduled engine parameter comprises a computer generating a scheduled fuel flow signal in response to operator demands and other control inputs;

said means for generating a signal reflecting the actual value of said parameter comprises a fuel flow meter interposed in said fuel flow path for generating a signal reflecting the actual fuel flow to said engine.

4. A fuel control system as in claim 1 wherein said speed ratio controlling means comprises:

a variable-area orifice interposed in said fuel flow path;

means for controlling the area of said variable-area orifice at a given value in response to operator demand and other control inputs;

means for actuating said variable speed ratio transmission in response to the pressure differential across said variable-area orifice to maintain a constant pressure differential thereacross;

whereby the fuel flow to said engine is directly proportional to the area of said variable area orifice.

5. A fuel control system as in claim 4 wherein said means for actuating said variable speed ratio transmission comprises:

a cylinder and a piston displaceable therein, said piston having an actuating rod extending therefrom for actuating said variable speed ratio drive in response to displacement of said piston in said cylinder;

conduit means for connecting the upstream and downstream pressure across said variable-area orifice to opposite ends of said cylinder;

means positioned in the end of said cylinder connected to the downstream side of said variable-area orifice or yieldably urging said piston to the opposite end of said cylinder with a predetermined force;

whereby said piston is displaced to actuate said variable speed ratio transmission to maintain a predetermined pressure differential across said variable area orifice.

6. A fuel control system as in claim 5 wherein said infinitely variable speed ratio transmission comprises a toroidal-type transmission comprising input and output toroids and steerable drive wheels interposed therebetween, the plane in which the drive wheels rotates being variable to vary the speed ratio between said input and output toroids.

7. A fuel control system as in claim 1 wherein said infinitely variable speed ratio transmission comprises a toroidal-type transmission comprising input and output toroids and steerable drive wheels interposed therebetween, the plane in which the drive wheels rotates being variable to vary the speed ratio between said input and output toroids.

8. A fuel control system as in claim 1 wherein said means for controlling the speed ratio of said toroidal transmission comprises:

means for generating a control signal reflecting a scheduled fuel flow to said engine in response to operator demand and other control inputs;

means interposed in said fuel flow path for generating a control signal reflecting the actual flow of fuel to said engine;

means receiving the signals from said fuel flow sensor and fuel schedule means for generating an error output signal;

means for steering and steerable drive wheels of said toroidal transmission in response to said error signal.

9. A fuel control system as in claim 8 wherein said fuel flow transducer and said fuel flow scheduling means and said error signal generating means are adapted to provide electrical output signals, and wherein said means for steering the steerable drive wheels of said toroidal drive comprises a torque motor generating a rotatable output in response to electrical input signals.

10. A fuel control system as in claim 1 wherein the variation in the speed of said engine rotor assembly is relatively large and the variation in speed ratio of the drive shaft for said fuel pump is relatively small, and wherein said fuel control system further comprises an engine accessory having approximately the same speed ratio requirements of said fuel pump and is driven from the input shaft to said fuel pump.

11. A fuel control system as in claim 10 wherein said means for controlling the speed ratio of said variable drive requires a source of electrical power for operation;

said accessory comprises an electrical generator driven by the input shaft to said pump for providing an electrical power source to said speed ratio controlling means.

12. A self-contained variable fuel delivery means for a gas turbine engine, said delivery means comprising:

a generally cylindrical housing;

an infinitely variable speed ratio toroidal-type transmission journaled in one end of said housing and having an input shaft extending from one end of said housing for a driving connection;

a fuel pump journaled in said housing and having a rotatable drive shaft extending to and integral with the output shaft of said toroidal transmission;

an accessory driven by the drive shaft extending between the output of said toroidal transmission and the fuel pump and positioned in said housing between said fuel pump and said toroidal drive.

13. A fuel delivery means as in claim 12 wherein said fuel pump is a centrifugal-type pump having a generally axially directed inlet and a radially directed outlet;

said housing has an annular chamber formed around the periphery of said centrifugal fuel pump and a radial port extending from said annular chamber for discharge of fuel from said device, said housing having a necked-down elongated inlet extending axially from the inlet to said centrifugal pump;

the variable speed ratio controlling means comprises a signal-generating means comprising a generally cylindrical assembly telescoped over the elongated portion of said housing and a means responsive to the control signals of said cylindrical assembly for actuating said toroidal drive.

14. A fuel delivery device as in claim 13 wherein:

said signal-generating assembly is adapted to generate electrical output signals;

the variable speed ratio transmission actuating means comprises a torque motor providing a rotatable output in response to electrical control signals from said signal-generating means; and said accessory comprises an alternator having a rotor assembly secured on the drive shafts between said toroidal transmission and said centrifugal fuel pump and a stator assembly positioned radially outward from said rotor assembly and having coils of wire thereon for connection to said signal-generating assembly as a source of electrical power thereto.